Jan. 4, 1966
K. A. McCREIGHT
3,227,929
LIGHT DETECTION DEVICE
Filed Oct. 13, 1961
2 Sheets-Sheet 1
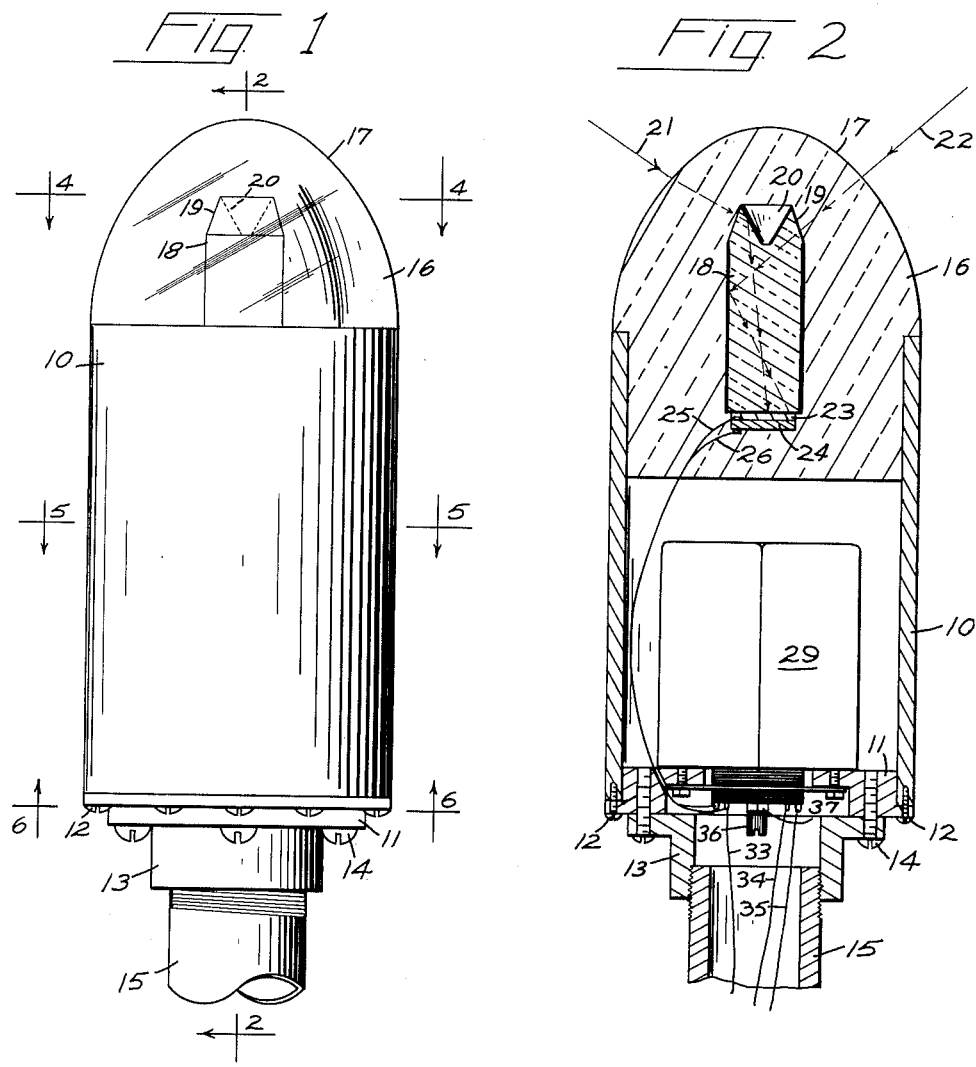
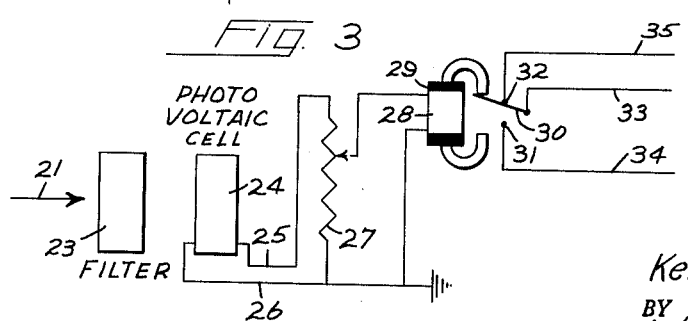
INVENTOR.
Kenneth A. McCreight
BY
Walls & St. John
Attys.

Jan. 4, 1966   K. A. McCREIGHT   3,227,929
LIGHT DETECTION DEVICE
Filed Oct. 13, 1961   2 Sheets-Sheet 2

INVENTOR.
Kenneth A. McCreight
BY
Wells & St. John
Attys.

United States Patent Office 3,227,929
Patented Jan. 4, 1966

3,227,929
LIGHT DETECTION DEVICE
Kenneth A. McCreight, Spokane, Wash., assignor, by
mesne assignments, to Kenneth A. McCreight, Spokane,
Wash.
Filed Oct. 13, 1961, Ser. No. 144,983
5 Claims. (Cl. 317—129)

This invention relates to a device adapted to automatically register the detection of light above a normal intensity.

The device described below was designed primarily for nuclear blast detection as a warning actuator and protective signal for mechanical closures. In case of near-by nuclear explosion, an instantaneous signal can be utilized to close mechanical vaults which mount missiles, etc. before the blast shock wave can damage the installation. According to the present invention this instantaneous signal is triggered by the light flash of the detonation, which can be detected an appreciable amount of time before the arrival of the shock wave at a given location.

It is a first object of this invention to provide a light detection device which is rugged in construction and capable of withstanding severe mechanical strain. The components of the device are simple and require no maintenance. In order to provide maximum strength and protection to the light sensitive elements of the device, they are permanently imbedded in a transparent monolithic structure.

Another object of the invention is to provide a light detection device which can be applied to other uses, such as a solar-light signal, by a simple adjustment of sensitivity.

The invention is also designed to provide effective observance of the entire area surrounding the installation. The incident light rays used to trigger the device may emanate at or below the horizon and at any elevation above the horizon.

These and further objects will be evident from a study of the following detailed description taken in conjunction with the accompanying drawings. The specific construction to be described is merely exemplary and may vary depending upon usage conditions. Therefore the extent of this invention is to be restricted only by the claims which follow.

In the drawings:

FIGURE 1 is an elevational view of the device as installed;

FIGURE 2 is a vertical sectional view taken along line 2—2 in FIGURE 1;

FIGURE 3 is a diagrammatic circuit diagram illustrating the components of the device;

Figure 4:
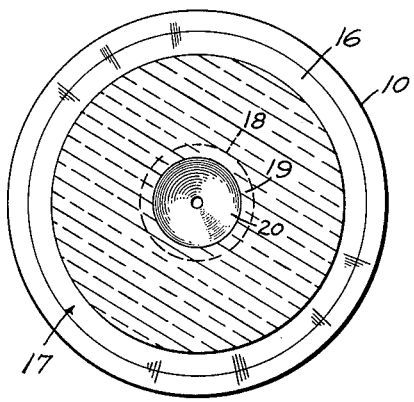
FIGURE 4 is an enlarged sectional view taken along line 4—4 in FIGURE 1 showing the inner reflective recess.
Figure 5:
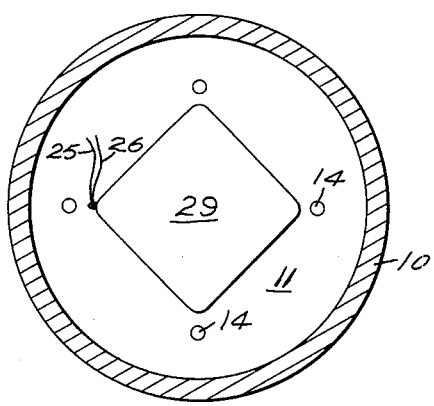
FIGURE 5 is an enlarged sectional view taken along line 5—5 in FIGURE 1.
Figure 6:
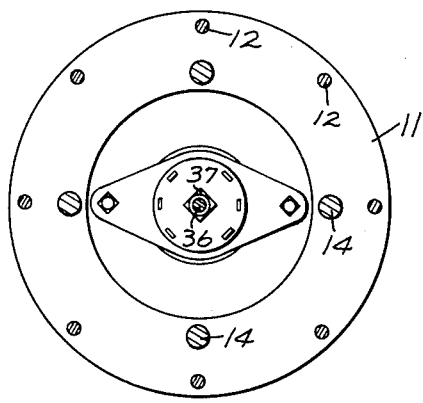
FIGURE 6 is an enlarged sectional view taken along line 6—6 in FIGURE 1.

The persent invention is primarily intended as a nuclear blast detector. A nucelar explosion results first in an intense flash of light far in excess of solar light intensity as measured on earth. This is followed by a destructive shock wave and radiation. Many miliary installations, such as missile launching areas, have automatic protective covers which can be operated to prevent blast damage if triggered soon enough before the shock wave. Such protective devices can also be utilized to minimize damage to civilian facilities. The time lag between the light flash and the shock wave is sufficient to insure such operations.

Besides operating protective shields, the present device, which is triggered by a high intensity flash of light, is useful to actuate alarm systems and to close valves on water lines and reservoirs to conserve potable water and firefighting water and to prevent additional damage by flooding. It may also be used to vent or open by-pass valves on fuel tanks and pipelines. It may automatically stop electrical generators and open electrical transmission circuits, and may initiate radiation protection apparatus.

In order to function under the intended conditions of constant exterior exposure, the device must be securely housed in a strong enclosure. As shown, this enclosure comprises a heavy metal cylindrical tube 10. A support ring 11 is fastened to the bottom end of tube 10 by screws 12. The ring 11 includes an annular shoulder which fits snugly within the interior of tube 10. A pipe flange 13 is fixed to ring 12 in a coaxial position by mounting screws 14. The pipe flange 13 is threaded so as to be fixed to a standard 15 in a permanent location.

The light sensing unit is located at the upper end of tube 10 within a solid transparent dome 16. Dome 16 has an annular shoulder which fits snugly within the tube 10. The dome may be sealed and mounted in any suitable fashion. It includes a curved upper surface 17. The material of dome 16 may vary depending upon the particular installation. A very suitable material is a transparent epoxy plastic resin. The low angle of defraction exhibited by such plastics is a most important quality in choosing this material.

Sealed within the dome 16 of the sensing unit is a coaxial transparent rod 18. Rod 18 should be a solid cylinder and is tapered at 19 near its upper end. This end is recessed in a conical configuration, shown at 20. The surfaces of the conical recess are coated with vaporized aluminum or other suitable reflective materials so as to form mirror surfaces facing outwardly. Likewise, the outer cylindrical surface of rod 18 is coated to form an inwardly facing cylindrical mirror. With this configuration, incident light rays striking the conical or outer surfaces within rod 18 will be reflected to its lower end as illustrated by the rays 21, 22 in FIGURE 2.

At the base of rod 18 is positioned a plane filter 23. Such optical filters are conventional. For nuclear signal purposes, the filter 23 should be selected to transmit only light rays having a wave length near the infrared end of the visible spectrum.

Directly adjacent the filter 23 is a photo sensitive voltaic cell 24. Cell 24 may be of any type which will generate electricity when activated by incident light. Conventional silicon photo-voltaic cells will serve this purpose.

The entire assembly of rod 18, filter 23, and cell 24 is cast within the monolithic structure of dome 16. This provides a strong, tamper-proof mounting unit exposed for 360 degrees from an elevation below the horizon to any altitude. Thus the light from a blast at any position in the vicinity of dome 16 will be capable of activating cell 24.

The two leads 25, 26 from cell 24 are wired across a variable resistance 27 shown in the diagram of FIGURE 3. The resistance 27 is wired in parallel with a coil 28 of a polarized D.C. relay 29. The relay 29 includes a common movable element 30 and two contacts 31, 32. The circuit from contact 31 is normally open, while the circuit from contact 32 is normally closed. The element 30 and contacts 31, 32 are provided with extension wires 33, 34 and 35 respectively, which are connected to an external control circuit.

The physical characteristics of these components can be seen in FIGURES 2, 4, 5 and 6. The relay 29 is conventional and is secured to support ring 11. Relay 29 has a sensitivity knob 36 which adjusts resistance 27. A lock nut 37 insures the constancy of the sensitivity adjustment.

The operation of the device is instantaneous. By adjustment of knob 36, the relay 29 may be made insensitive to the light received from normal artificial or natural sources. The current supplied from cell 24 will be insufficient to cause relay 29 to move element 30. Should a nuclear explosion occur, the bright flash of light with its high infra-red waves, will excite cell 24 and activate relay 29 to thereby move element 30. This will result in the operation of exterior circuits of any desired design.

Figure 7:
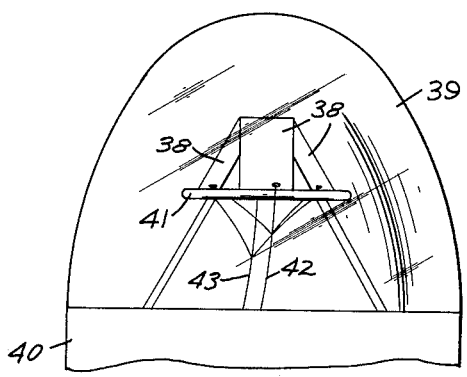
FIGURE 7 is an elevational view of the transparent dome of an alternative form of the device.

An alternative form of the light sensing head is shown in FIGURE 7. In this instance three or more photovoltaic cells 38 are imbedded within a dome 39 mounted on a tube 40. The cells 38 are supported on a ring 41 for casting purposes. The leads 42, 43 from each cell 38 are wired in parallel and connected to the resistance 27 previously described. The remainder of the device is identical to that just described.

This form may utilize the dome 39 as a direct filter if necessary, since dome 39 may be tinted if necessary. The directional properties of this form are slightly variable, but would be more than adequate where light having the intensity of a nuclear device would be monitored.

It is possible to adapt this device to non-nuclear usage by changing the property of filter 23 and by regulation of knob 36 to vary the sensitivity of relay 29. The unit may be used as a natural light detector to turn street lamps on and off automatically in response to sunlight. It may be used as a burglar alarm monitor to be energized by the turning off of artificial lights. The obvious possibilities of such a light sensitive device are numberless.

Various changes can be made in the specific structure shown without deviating from the basic precepts of this invention. For this reason, only the following claims are intended to limit my invention.

Having thus described my invention, I claim:

1. A light sensitive device comprising:
   a rigid supporting enclosure;
   a solid dome of transparent material fixed to said enclosure and extending outwardly therefrom;
   a cylindrical transparent rod embedded within said dome, said rod having a conical axial recess formed in the rod end adjacent the dome surface, the surface of said recess being light reflective, the outside surface of said rod being light reflective from its remaining end to a plane perpendicular to the rod axis as the apex of said recess;
   and light sensitive generating means located adjacent said remaining end of said rod in axial alignment therewith.

2. A light sensitive device as defined in claim 1 further comprising:
   relay means mounted within said enclosure including contacts wired to an exterior operating circuit, the coil of said relay means being electrically connected to said light sensitive generating means whereby activation of said generating means by incident light will result in activation of said contacts of said relay means.

3. A light sensitive device as defined in claim 1 further comprising:
   light filtering means interposed between said remaining end of said rod and said generating means.

4. A light sensitive device comprising:
   a mounting base adapted to be fixed to a foundation element;
   an upright hollow enclosure fixed to said mounting base and extending upwardly therefrom;
   a solid dome of transparent material fixed to the upper end of said enclosure and extending upwardly therefrom;
   a cylindrical transparent rod mounted in an upright position within said dome, said rod having an inverted conical recess formed of light reflective surfaces, the surface of said rod being light reflective from the lower end of said rod to the elevation of the apex of said recess;
   and light sensitive generating means mounted adjacent the lower end of said rod in axial alignment therewith.

5. A light sensitive device comprising:
   a mounting base adapted to be fixed to a foundation element;
   an upright hollow enclosure fixed to said mounting base and extending upwardly therefrom;
   a solid dome of transparent material fixed to the upper end of said enclosure and extending upwardly therefrom;
   a cylindrical transparent rod mounted in an upright position within said dome, said rod having an inverted conical recess formed of light reflective surfaces, the surface of said rod being light reflective from the lower end of said rod to the elevation of the apex of said recess;
   light sensitive generating means mounted adjacent the lower end of said rod in axial alignment therewith;
   light filtering means interposed between said rod and said generating means;
   and relay means in said enclosure including contacts wired to an exterior operating circuit, the relay coil of said relay means being electrically connected to said generating means, whereby activation of said generating means by incident light will result in activation of said contacts of said relay means.

References Cited by the Examiner

UNITED STATES PATENTS

| | | | |
|---|---|---|---|
| 2,089,830 | 8/1937 | Grohndahl et al. | 317—129 XR |
| 2,755,392 | 7/1956 | Garnick | 250—239 |
| 2,756,349 | 7/1956 | Frank | 250—239 |
| 2,898,525 | 8/1959 | Jacobs | 317—124 |
| 2,978,591 | 4/1961 | Ringger | 317—124 XR |

SAMUEL BERNSTEIN, *Primary Examiner.*